(12) United States Patent
Kim et al.

(10) Patent No.: US 10,776,673 B2
(45) Date of Patent: Sep. 15, 2020

(54) LEARNING METHOD AND LEARNING DEVICE FOR SENSOR FUSION TO INTEGRATE INFORMATION ACQUIRED BY RADAR CAPABLE OF DISTANCE ESTIMATION AND INFORMATION ACQUIRED BY CAMERA TO THEREBY IMPROVE NEURAL NETWORK FOR SUPPORTING AUTONOMOUS DRIVING, AND TESTING METHOD AND TESTING DEVICE USING THE SAME

(71) Applicant: Stradvision, Inc., Pohang-si, Gyeongsangbuk-do (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/731,990

(22) Filed: Dec. 31, 2019

(65) Prior Publication Data
US 2020/0250468 A1 Aug. 6, 2020

Related U.S. Application Data

(60) Provisional application No. 62/799,216, filed on Jan. 31, 2019.

(51) Int. Cl.
*G06K 9/00* (2006.01)
*G06K 9/62* (2006.01)
(Continued)

(52) U.S. Cl.
CPC .............. *G06K 9/629* (2013.01); *G01S 7/417* (2013.01); *G01S 13/867* (2013.01);
(Continued)

(58) Field of Classification Search
CPC .... G06K 9/629; G06K 9/6232; G06K 9/6261; G06K 9/6256; G06K 9/6262;
(Continued)

(56) References Cited

U.S. PATENT DOCUMENTS 9,947,103 B1 * 4/2018 Kim .......................... G06T 7/12
10,300,851 B1 * 5/2019 Kim ...................... G06K 9/6271
(Continued)

*Primary Examiner* — Aaron W Carter
(74) *Attorney, Agent, or Firm* — Kaplan Breyer Schwarz, LLP

(57) ABSTRACT

A method for training a CNN by using a camera and a radar together, to thereby allow the CNN to perform properly even when an object depiction ratio of a photographed image acquired through the camera is low due to a bad condition of a photographing circumstance is provided. And the method includes steps of: (a) a learning device instructing a convolutional layer to apply a convolutional operation to a multichannel integrated image, to thereby generate a feature map; (b) the learning device instructing an output layer to apply an output operation to the feature map, to thereby generate estimated object information; and (c) the learning device instructing a loss layer to generate a loss by using the estimated object information and GT object information corresponding thereto, and to perform backpropagation by using the loss, to thereby learn at least part of parameters in the CNN.

18 Claims, 5 Drawing Sheets

(51) Int. Cl.
  *G01S 13/86*      (2006.01)
  *G01S 7/41*       (2006.01)
  *G01S 13/931*     (2020.01)
  *G06N 20/00*      (2019.01)
  *G06N 7/00*       (2006.01)
  *G06T 7/70*       (2017.01)

(52) U.S. Cl.
  CPC .......... *G01S 13/931* (2013.01); *G06K 9/6228* (2013.01); *G06K 9/6232* (2013.01); *G06K 9/6256* (2013.01); *G06K 9/6261* (2013.01); *G06K 9/6262* (2013.01); *G06N 7/005* (2013.01); *G06N 20/00* (2019.01); *G06T 7/70* (2017.01); *G06T 2207/10028* (2013.01); *G06T 2207/10044* (2013.01); *G06T 2207/20076* (2013.01); *G06T 2207/20081* (2013.01); *G06T 2207/20084* (2013.01); *G06T 2207/30252* (2013.01)

(58) Field of Classification Search
  CPC ... G06K 9/6228; G01S 13/867; G01S 13/931; G01S 7/417; G06N 7/005; G06N 20/00; G06T 7/70; G06T 2207/10028; G06T 2207/30252; G06T 2207/10044; G06T 2207/20076; G06T 2207/20084; G06T 2207/20081
  See application file for complete search history.

(56) References Cited

U.S. PATENT DOCUMENTS

| | | | | |
|---|---|---|---|---|
| 10,311,578 | B1* | 6/2019 | Kim | G06K 9/6274 |
| 10,496,899 | B1* | 12/2019 | Kim | G06K 9/6256 |
| 2015/0234044 | A1* | 8/2015 | Ouchi | G01S 13/93 |
| | | | | 342/27 |
| 2016/0328630 | A1* | 11/2016 | Han | G06K 9/6272 |
| 2017/0287137 | A1* | 10/2017 | Lin | G06K 9/66 |
| 2019/0311202 | A1* | 10/2019 | Lee | G06K 9/627 |
| 2019/0382007 | A1* | 12/2019 | Casas | G05D 1/0221 |
| 2020/0025935 | A1* | 1/2020 | Liang | G01S 7/4817 |
| 2020/0066036 | A1* | 2/2020 | Choi | G06K 9/6203 |

* cited by examiner

LEARNING METHOD AND LEARNING DEVICE FOR SENSOR FUSION TO INTEGRATE INFORMATION ACQUIRED BY RADAR CAPABLE OF DISTANCE ESTIMATION AND INFORMATION ACQUIRED BY CAMERA TO THEREBY IMPROVE NEURAL NETWORK FOR SUPPORTING AUTONOMOUS DRIVING, AND TESTING METHOD AND TESTING DEVICE USING THE SAME

CROSS REFERENCE OF RELATED APPLICATION

This present application claims the benefit of the earlier filing date of provisional patent application No. 62/799,216, filed Jan. 31, 2019, the entire contents of which being incorporated herein by reference.

FIELD OF THE DISCLOSURE

The present disclosure relates to a learning method and a learning device for use with an autonomous vehicle; for more particularly, to the learning method and the learning device for a sensor fusion to integrate information acquired by a radar capable of a distance estimation and information acquired by a camera, to thereby improve a neural network for supporting an autonomous driving, and a testing method and a testing device using the same.

BACKGROUND OF THE DISCLOSURE

Recently, in a field of autonomous driving, generally three types of sensors are used for detecting objects surrounding an autonomous vehicle. The three types of sensors may include a Lidar, a radar and a camera. Each of such sensors may have each of shortcomings. For example, a shortcoming of the Lidar may be that it is too expensive to be used widely, that of the radar may be a low performance when used alone, and that of the camera may be that it may be unstable because it is affected much by surrounding circumstances such as weather.

Using each of the sensors separately may have shortcomings as shown above, so a method for a sensor fusion is necessary.

However, so far only a superficial information integration strategy has been studied, thus a method for a substantial sensor fusion has not been much studied.

SUMMARY OF THE DISCLOSURE

It is an object of the present disclosure to solve all the aforementioned problems.

It is another object of the present disclosure to provide a learning method for a sensor fusion to integrate information acquired by a radar capable of a distance estimation and information acquired by a camera, to thereby improve a neural network for supporting an autonomous driving.

It is still another object of the present disclosure to provide a method for supporting the autonomous driving by allowing the neural network to use integrated information which has been generated by channel-wise concatenating the information acquired by the radar and the information acquired by the camera.

It is still yet another object of the present disclosure to supplement insufficient information acquired through the camera without information on a specific object by using additional information acquired through the radar including information on the specific object.

In accordance with one aspect of the present disclosure, there is provided a method for training a Convolutional Neural Network (CNN) by using a camera and a radar together, to thereby allow the CNN to perform properly even when an object depiction ratio of a photographed image, which represents a probability of one or more objects in the photographed image being illustrated properly, acquired through the camera is low due to a bad condition of a photographing circumstance, including steps of: (a) a learning device, if a multichannel integrated image, which is generated by using (i) the photographed image acquired through the camera on a subject vehicle interworking with the learning device and (ii) a depth image acquired through the radar thereon, is acquired, instructing at least one convolutional layer in the CNN to apply at least one convolutional operation to the multichannel integrated image, to thereby generate at least one feature map, on which information on the photographed image and information on the depth image are reflected; (b) the learning device instructing at least one output layer in the CNN to apply at least one output operation to the feature map, to thereby generate estimated object information on the objects in the multichannel integrated image; and (c) the learning device instructing at least one loss layer in the CNN to generate at least one loss by using the estimated object information and Ground-Truth (GT) object information corresponding thereto, and to perform backpropagation by using the loss, to thereby learn at least part of parameters in the CNN.

As one example, at the step of (a), the learning device (i) acquires information on one or more distances and one or more angles of the objects from the subject vehicle by referring to the depth image, (ii) finds one or more object coordinates, corresponding to at least part of the objects, on the photographed image by referring to information on the distances and the angles, (iii) generates at least one guide channel image by setting values which are generated by referring to the object coordinates and probability distributions, as its pixel values included in the guide channel image, and (iv) generates the multichannel integrated image by channel-wise concatenating the guide channel image with the photographed image.

As one example, at the step of (a), the learning device, by referring to a first object coordinate to an N-th object coordinate among the object coordinates and the probability distributions, performs an operation according to a following formula, to thereby calculate said values to be included in the guide channel image as its pixel values:

$$D(P_k) = \sum_{m=1}^{N} \exp\left\{-\frac{(P_{k_x} - G_{m_x})^2 + (P_{k_y} - G_{m_y})^2}{\sigma}\right\}$$

wherein $P_k$ denotes a k-th pixel among pixels included in the guide channel image, each of $P_{k_x}$ and $P_{k_y}$ denotes each of an x coordinate and a y coordinate of the k-th pixel on the guide channel image, each of $G_{m_x}$ and $G_{m_y}$ denotes each of an x coordinate and a y coordinate of an m-th object coordinate, and $\sigma$ denotes a prescribed size adjustment value, wherein m is an integer from 1 to N.

As one example, at the step of (b), the learning device may instruct a Region Proposal Network (RPN) interworking with the CNN to generate information on one or more estimated Region-Of-Interests (ROIs) corresponding to one or more locations of at least part of the objects on the multichannel integrated image by referring to the feature map, and may instruct the output layer which has been built as a Fully-Connected (FC) network to apply the output operation to the feature map by referring to the estimated ROIs, to thereby generate the estimated object information including an estimated object detection result corresponding to the multichannel integrated image.

As one example, at the step of (a), the learning device instructs each of convolutional neurons included in the convolutional layer to repeat a process of applying an operation to its inputted value by using its own at least one parameter and delivering its outputted value to its next convolutional neuron, to thereby apply the convolutional operation to the multichannel integrated image.

As one example, at the step of (b), the learning device instructs the output layer which has been built as at least one deconvolutional layer corresponding to the convolutional layer to apply the output operation to the feature map, to thereby generate the estimated object information including an estimated segmentation image corresponding to the multichannel integrated image.

As one example, the learning device instructs the convolutional layer to generate the feature map on which the information on the photographed image and the information on the depth image are reflected, to thereby allow information on each of specific objects, among the objects, whose object depiction ratio is smaller than a threshold to be further included in the estimated object information.

In accordance with still another aspect of the present disclosure, there is provided a method for testing a Convolutional Neural Network (CNN) by using a camera and a radar together, to thereby allow the CNN to perform properly even when an object depiction ratio of a photographed image, which represents a probability of one or more objects in the photographed image being illustrated properly, acquired through the camera is low due to a bad condition of a photographing circumstance, including steps of: (a) on condition that (1) a learning device, if a multichannel integrated image for training, which is generated by using (i) a photographed image for training acquired through a camera for training on a subject vehicle for training interworking with the learning device and (ii) a depth image for training acquired through a radar for training thereon, is acquired, has instructed at least one convolutional layer in the CNN to apply at least one convolutional operation to the multichannel integrated image for training, to thereby generate at least one feature map for training, on which information on the photographed image for training and information on the depth image for training are reflected; (2) the learning device has instructed at least one output layer in the CNN to apply at least one output operation to the feature map for training, to thereby generate estimated object information for training on the objects for training in the multichannel integrated image for training; and (3) the learning device has instructed at least one loss layer in the CNN to generate at least one loss by using the estimated object information for training and Ground-Truth (GT) object information corresponding thereto, and to perform backpropagation by using the loss, to thereby learn at least part of parameters in the CNN, a testing device instructing the convolutional layer in the CNN to apply the convolutional operation to a multichannel integrated image for testing which is generated by using (i) a photographed image for testing acquired through a camera for testing on a subject vehicle for testing interworking with the testing device and (ii) a depth image for testing acquired through a radar for testing thereon, to thereby generate at least one feature map for testing, on which information on the photographed image for testing and information on the depth image for testing are reflected; (b) the testing device instructing the output layer in the CNN to apply the output operation to the feature map for testing, to thereby generate estimated object information for testing on the objects for testing in the multichannel integrated image for testing.

As one example, at the step of (a), the testing device (i) acquires information for testing on one or more distances for testing and one or more angles for testing of the objects for testing from the subject vehicle for testing, (ii) finds one or more object coordinates for testing, corresponding to at least part of the objects for testing, on the multichannel integrated image for testing by referring to information for testing on the distances for testing and the angles for testing, (iii) generates at least one guide channel image for testing by setting values which are generated by referring to the object coordinates for testing and probability distributions for testing, as its pixel values for testing included in the guide channel image for testing, and (iv) generates the multichannel integrated image for testing by channel-wise concatenating the guide channel image for testing with the photographed image for testing.

As one example, at the step of (a), the testing device, by referring to a first object coordinate for testing to an N-th object coordinate for testing among the object coordinates for testing and the probability distributions for testing, performs an operation according to a following formula, to thereby calculate said values to be included in the guide channel image for testing as its pixel values for testing:

$$D(P_k) = \sum_{m=1}^{N} \exp\left\{-\frac{(P_{k_x} - G_{m_x})^2 + (P_{k_y} - G_{m_y})^2}{\sigma}\right\}$$

wherein $P_k$ denotes a k-th pixel among pixels included in the guide channel image for testing, each of $P_{k_x}$ and $P_{k_y}$ denotes each of an x coordinate and a y coordinate of the k-th pixel on the guide channel image for testing, each of $G_{m_x}$ and $G_{m_y}$ denotes each of an x coordinate and a y coordinate of an m-th object coordinate for testing, and $\sigma$ denotes a prescribed size adjustment value for testing, wherein m is an integer from 1 to N.

As one example, the testing device instructs the convolutional layer to generate the feature map for testing on which the information on the photographed image for testing and the information on the depth image for testing are reflected, to thereby allow information on each of specific objects for testing, among the objects for testing, whose object depiction ratio is smaller than a threshold to be further included in the estimated object information for testing, and the method further includes a step of: (c) the testing device delivering the estimated object information for testing to at least one autonomous driving module on the subject vehicle for testing, to thereby support the autonomous driving of the subject vehicle for testing.

In accordance with still another aspect of the present disclosure, there is provided a learning device for training a Convolutional Neural Network (CNN) by using a camera and a radar together, to thereby allow the CNN to perform properly even when an object depiction ratio of a photographed image, which represents a probability of one or more objects in the photographed image being illustrated properly, acquired through the camera is low due to a bad condition of a photographing circumstance, including: at least one memory that stores instructions; and at least one processor configured to execute the instructions to perform processes of: (I) if a multichannel integrated image, which is generated by using (i) the photographed image acquired through the camera on a subject vehicle interworking with the learning device and (ii) a depth image acquired through the radar thereon, is acquired, instructing at least one convolutional layer in the CNN to apply at least one convolutional operation to the multichannel integrated image, to thereby generate at least one feature map, on which information on the photographed image and information on the depth image are reflected; (II) instructing at least one output layer in the CNN to apply at least one output operation to the feature map, to thereby generate estimated object information on the objects in the multichannel integrated image; and (III) instructing at least one loss layer in the CNN to generate at least one loss by using the estimated object information and Ground-Truth (GT) object information corresponding thereto, and to perform backpropagation by using the loss, to thereby learn at least part of parameters in the CNN.

As one example, at the process of (I), the processor (i) acquires information on one or more distances and one or more angles of the objects from the subject vehicle by referring to the depth image, (ii) finds one or more object coordinates, corresponding to at least part of the objects, on the photographed image by referring to information on the distances and the angles, (iii) generates at least one guide channel image by setting values which are generated by referring to the object coordinates and probability distributions, as its pixel values included in the guide channel image, and (iv) generates the multichannel integrated image by channel-wise concatenating the guide channel image with the photographed image.

As one example, at the process of (I), the processor, by referring to a first object coordinate to an N-th object coordinate among the object coordinates and the probability distributions, performs an operation according to a following formula, to thereby calculate said values to be included in the guide channel image as its pixel values:

$$D(P_k) = \sum_{m=1}^{N} \exp\left\{-\frac{(P_{k_x} - G_{m_x})^2 + (P_{k_y} - G_{m_y})^2}{\sigma}\right\}$$

wherein $P_k$ denotes a k-th pixel among pixels included in the guide channel image, each of $P_{k_x}$ and $P_{k_y}$ denotes each of an x coordinate and a y coordinate of the k-th pixel on the guide channel image, each of $G_{m_x}$ and $G_{m_y}$ denotes each of an x coordinate and a y coordinate of an m-th object coordinate, and $\sigma$ denotes a prescribed size adjustment value, wherein m is an integer from 1 to N.

As one example, at the process of (II), the processor may instruct a Region Proposal Network (RPN) interworking with the CNN to generate information on one or more estimated Region-Of-Interests (ROIs) corresponding to one or more locations of at least part of the objects on the multichannel integrated image by referring to the feature map, and may instruct the output layer which has been built as a Fully-Connected (FC) network to apply the output operation to the feature map, to thereby generate the estimated object information including an estimated object detection result corresponding to the multichannel integrated image.

As one example, at the process of (I), the processor instructs each of convolutional neurons included in the convolutional layer to repeat a process of applying an operation to its inputted value by using its own at least one parameter and delivering its outputted value to its next convolutional neuron, to thereby apply the convolutional operation to the multichannel integrated image.

As one example, at the process of (II), the processor instructs the output layer which has been built as at least one deconvolutional layer corresponding to the convolutional layer to apply the output operation to the feature map, to thereby generate the estimated object information including an estimated segmentation image corresponding to the multichannel integrated image.

As one example, the processor instructs the convolutional layer to generate the feature map on which the information on the photographed image and the information on the depth image are reflected, to thereby allow information on each of specific objects, among the objects, whose object depiction ratio is smaller than a threshold to be further included in the estimated object information.

In accordance with still yet another aspect of the present disclosure, there is provided a testing device for testing a Convolutional Neural Network (CNN) by using a camera and a radar together, to thereby allow the CNN to perform properly even when an object depiction ratio of a photographed image, which represents a probability of one or more objects in the photographed image being illustrated properly, acquired through the camera is low due to a bad condition of a photographing circumstance, including: at least one memory that stores instructions; and at least one processor configured to execute the instructions to perform processes of: (I) on condition that (1) a learning device, if a multichannel integrated image for training, which is generated by using (i) a photographed image for training acquired through a camera for training on a subject vehicle for training interworking with the learning device and (ii) a depth image for training acquired through a radar for training thereon, is acquired, has instructed at least one convolutional layer in the CNN to apply at least one convolutional operation to the multichannel integrated image for training, to thereby generate at least one feature map for training, on which information on the photographed image for training and information on the depth image for training are reflected; (2) the learning device has instructed at least one output layer in the CNN to apply at least one output operation to the feature map for training, to thereby generate estimated object information for training on the objects for training in the multichannel integrated image for training; and (3) the learning device has instructed at least one loss layer in the CNN to generate at least one loss by using the estimated object information for training and Ground-Truth (GT) object information corresponding thereto, and to perform backpropagation by using the loss, to thereby learn at least part of parameters in the CNN, instructing the convolutional layer in the CNN to apply the convolutional operation to the multichannel integrated image for testing which is generated by using (i) a photographed image for testing acquired through a camera for testing on a subject vehicle for testing interworking with the testing device and (ii) a depth image for testing acquired through a radar for testing thereon, to thereby generate at least one feature map for testing, on which information on the photographed image for testing and information on the depth image for testing are reflected; (II) instructing the output layer in the CNN to apply the output operation to the feature map for testing, to thereby generate estimated object information for testing on the objects for testing in the multichannel integrated image for testing.

As one example, at the process of (I), the processor (i) acquires information for testing on one or more distances for testing and one or more angles for testing of the objects for testing from the subject vehicle for testing by referring to the depth image for testing, (ii) finds one or more object coordinates for testing, corresponding to at least part of the objects for testing, on the photographed image for testing by referring to information for testing on the distances for testing and the angles for testing, (iii) generates at least one guide channel image for testing by setting values which are generated by referring to the object coordinates for testing and probability distributions for testing, as its pixel values for testing included in the guide channel image for testing, and (iv) generates the multichannel integrated image for testing by channel-wise concatenating the guide channel image for testing with the photographed image for testing.

As one example, at the process of (I), the processor, by referring to a first object coordinate for testing to an N-th object coordinate for testing among the object coordinates for testing and the probability distributions for testing, performs an operation according to a following formula, to thereby calculate said values to be included in the guide channel image for testing as its pixel values for testing:

$$D(P_k) = \sum_{m=1}^{N} \exp\left\{-\frac{(P_{k_x} - G_{m_x})^2 + (P_{k_y} - G_{m_y})^2}{\sigma}\right\}$$

wherein $P_k$ denotes a k-th pixel among pixels included in the guide channel image for testing, each of $P_{k_x}$ and $P_{k_y}$ denotes each of an x coordinate and a y coordinate of the k-th pixel on the guide channel image for testing, each of $G_{m_x}$ and $G_{m_y}$ denotes each of an x coordinate and a y coordinate of an m-th object coordinate for testing, and $\sigma$ denotes a prescribed size adjustment value for testing, wherein m is an integer from 1 to N.

As one example, the processor instructs the convolutional layer to generate the feature map for testing on which the information on the photographed image for testing and the information on the depth image for testing are reflected, to thereby allow information on each of specific objects for testing, among objects for testing, whose object depiction ratio is smaller than a threshold to be further included in the estimated object information for testing, and the processor further performs a process of: (III) delivering the estimated object information for testing to at least one autonomous driving module on the subject vehicle for testing, to thereby support the autonomous driving of the subject vehicle for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
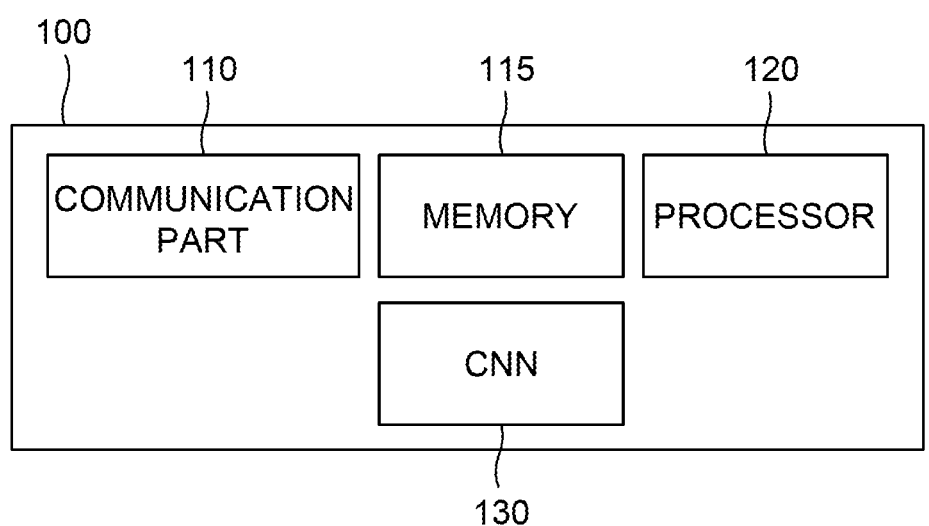
FIG. 1 is a drawing schematically illustrating a configuration of a learning device performing a learning method for a sensor fusion to integrate information acquired by a radar capable of a distance estimation and information acquired by a camera, to thereby improve a neural network for supporting an autonomous driving in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a configuration of a learning device performing a learning method for a sensor fusion to integrate information acquired by a radar capable of a distance estimation and information acquired by a camera, to thereby improve a neural network for supporting an autonomous driving in accordance with one example embodiment of the present disclosure.

By referring to FIG. 1, the learning device 100 may include a Convolutional Neural Network (CNN) 130, to be described later. Processes of input/output and computations of the CNN 130 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

Such learning device 100 may interwork with a subject vehicle, and may acquire at least part of training data, i.e., a photographed image and a depth image to be explained later, through at least one camera and at least one radar on the subject vehicle, respectively. Also, the learning device 100 may acquire annotation data, i.e., Ground-Truth (GT) object information to be explained later, corresponding to the training data. Herein, the GT object information to which information on one or more objects included in the photographed image is tagged may be inputted to the learning device 100 by a manager, but a scope of the present disclosure may not be limited thereto.

So far the configuration of the learning device 100 performing the learning method for the sensor fusion to integrate the information acquired by the radar capable of the distance estimation and the information acquired by the camera, to thereby improve the neural network for supporting the autonomous driving in accordance with one example embodiment of the present disclosure has been explained. Below, a configuration of the CNN 130 included therein will be explained.

Figure 2:
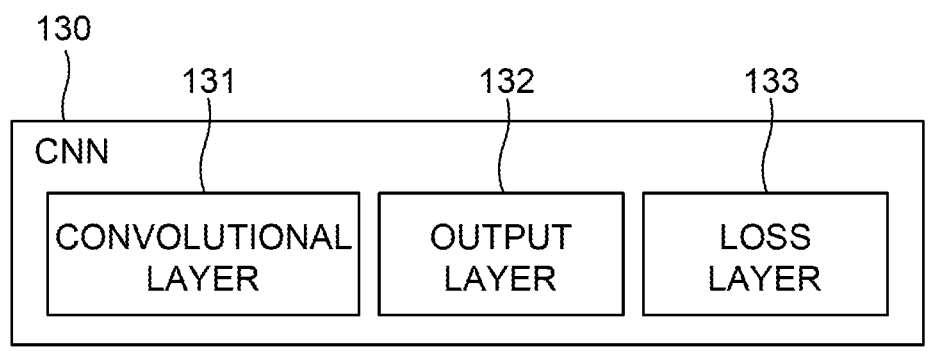
FIG. 2 is a drawing schematically illustrating a configuration of a Convolutional Neural Network (CNN) to be used for performing the learning method for the sensor fusion to integrate the information acquired by the radar capable of the distance estimation and the information acquired by the camera, to thereby improve the neural network for supporting the autonomous driving in accordance with one example embodiment of the present disclosure.

FIG. 2 is a drawing schematically illustrating a configuration of the CNN 130 to be used for performing the learning method for the sensor fusion to integrate the information acquired by the radar capable of the distance estimation and the information acquired by the camera, to thereby improve the neural network for supporting the autonomous driving in accordance with one example embodiment of the present disclosure.

By referring to FIG. 2, the CNN 130 may include at least one convolutional layer 131, at least one output layer 132 and at least one loss layer 133. Herein, the convolutional layer 131 may apply at least one convolutional operation to its inputted image. More specifically, the learning device 100 may instruct each of convolutional neurons included in the convolutional layer 131 to repeat a process of applying an operation to its inputted value by using its own at least one parameter and delivering its outputted value to its next convolutional neuron, to thereby apply the convolutional operation to said its inputted image.

Also, the output layer 132 can be built differently according to a desired output thereof. For example, if a manager wants estimated object information, which is an output of the CNN 130 to be explained later, to include an estimated segmentation image corresponding to its inputted image, the output layer 132 may be built as at least one deconvolutional layer corresponding to the convolutional layer 131, and it may perform at least one deconvolutional operation as the output operation. Different from this, if the manager wants the estimated object information to include an estimated object detection result on the objects in its inputted image, the manager may set a Region Proposal Network (RPN) interworking with the CNN 130, and may build the output layer 132 as a Fully-Connected (FC) layer. Herein, the RPN may, by referring to a feature map generated by the convolutional layer 131, generate information on one or more estimated Region-Of-Interests (ROIs) corresponding to one or more locations of at least part of the objects on an image corresponding to the feature map, and the output layer 132 which has been built as the FC layer may apply an FC operation as the output operation to the feature map by referring to the information on the estimated ROIs, to thereby generate the estimated object information including the estimated object detection result.

And, the loss layer 133, to be explained later, may generate a loss and perform backpropagation by using the loss, to thereby learn at least part of parameters of the CNN 130.

So far the CNN 130 to be used for performing the learning method of the present disclosure has been explained. Below, the learning method itself will be explained, by referring to FIG. 3.

Figure 3:
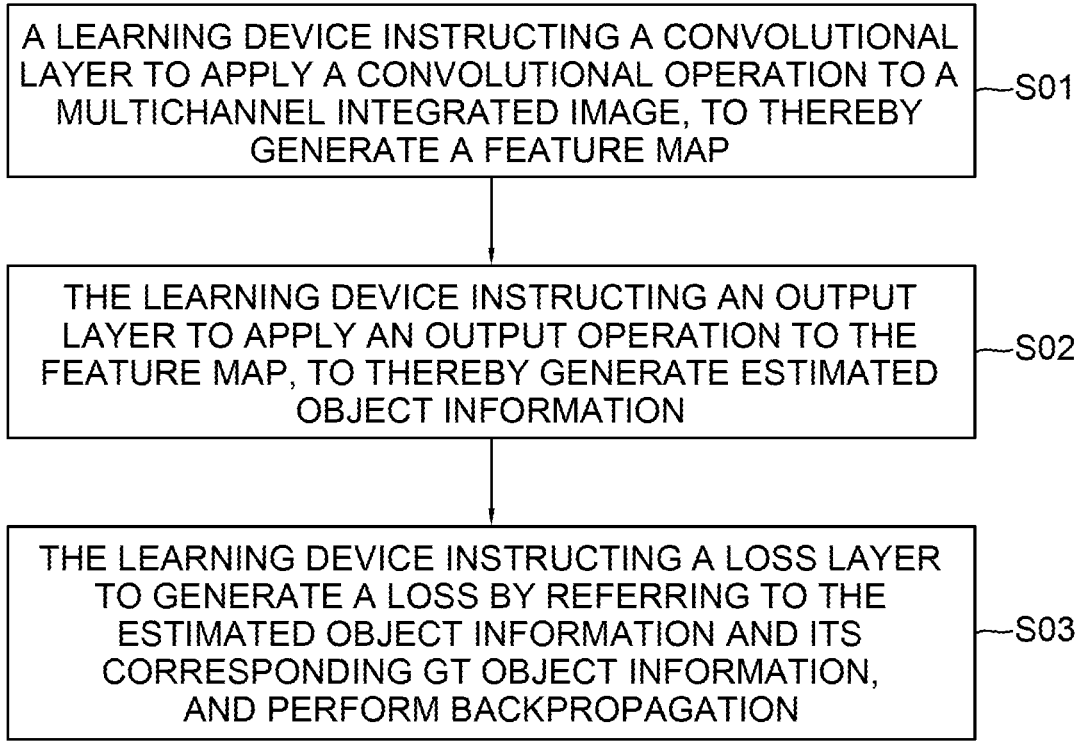
FIG. 3 is a drawing schematically illustrating a flow of the learning method for the sensor fusion to integrate the information acquired by the radar capable of the distance estimation and the information acquired by the camera, to thereby improve the neural network for supporting the autonomous driving in accordance with one example embodiment of the present disclosure.

FIG. 3 is a drawing schematically illustrating a flow of the learning method for the sensor fusion to integrate the information acquired by the radar capable of the distance estimation and the information acquired by the camera, to thereby improve the neural network for supporting the autonomous driving in accordance with one example embodiment of the present disclosure.

By referring to FIG. 3, at a step of S01, the learning device 100 may, if a multichannel integrated image, which is generated by using the photographed image and the depth image acquired through said camera and said radar on the subject vehicle respectively, is acquired, instruct the convolutional layer 131 in the CNN 130 to apply the convolutional operation to the multichannel integrated image, to thereby generate the feature map, on which information on the photographed image and information on the depth image are reflected. Then, at a step of S02, the learning device 100 may instruct the output layer 132 in the CNN 130 to apply the output operation to the feature map, to thereby generate the estimated object information on objects in the multichannel integrated image. Finally, at a step of S03, the learning device 100 may instruct the loss layer 133 in the CNN 130 to generate the loss by referring to the estimated object information and its corresponding GT object information and to perform backpropagation by referring to the loss, to thereby learn at least part of the parameters of the CNN 130. Below, it will be explained more specifically.

First, how the multichannel integrated image can be acquired will be explained. Herein, the photographed image may have three channels, i.e., R, G and B or H, S and V, because it is an image acquired through the camera which is common. The depth image may have two channels, because it includes two kinds of information, i.e., one or more distances and one or more angles of the objects from the subject vehicle. The photographed image and the depth image cannot be directly concatenated, because sizes of the two are so different. Thus, the learning device 100 may find one or more object coordinates, corresponding to at least part of the objects, on the photographed image by referring to the information on the distances and the angles. Specifically, the learning device 100 may (i) acquire Field-Of-View (FOV) information of the camera by using its parameter information, (ii) may map each of pixels in the photographed image onto a virtual 3-dimensional space by referring to the FOV information, and (iii) may compare mapped locations of the pixels in the virtual 3-dimensional space with the information on the distances and the angles, to thereby calculate the object coordinates on the multichannel integrated image.

Herein, each of the object coordinates may be determined by using each of one or more center coordinates of the objects or multiple coordinates for each of the objects according to characteristics thereof including shapes, but a scope of the present disclosure may not be limited thereto.

After the object coordinates are acquired, the learning device 100 may generate at least one guide channel image by setting values, which are generated by referring to the object coordinates and probability distributions, as its pixel values included in the guide channel image. By performing this process, the depth image can be concatenated with the photographed image in a form of the guide channel image.

Herein, the pixel values can be calculated by performing an operation according to a following formula. For convenience, it is assumed that there are a first object coordinate to an N-th object coordinate in the object coordinates, and N is an integer corresponding to the number of the objects in the photographed image.

$$D(P_k) = \sum_{m=1}^{N} \exp\left\{ -\frac{(P_{k_x} - G_{m_x})^2 + (P_{k_y} - G_{m_y})^2}{\sigma} \right\}$$

In the formula, $P_k$ may denote a k-th pixel among pixels included in the guide channel image, and each of $P_{k_x}$ and $P_{k_y}$ may denote each of an x coordinate and a y coordinate of the k-th pixel on the guide channel image. And, while m is an integer from 1 to N, each of $G_{m_x}$ and $G_{m_y}$ may denote each of an x coordinate and a y coordinate of an m-th object coordinate. Also, σ may denote a prescribed size adjustment value. By using the formula above, a first example pixel value whose location is relatively closer to any of the object coordinates may be calculated as relatively larger, and a second example pixel value whose location is relatively farther from most of the object coordinates may be calculated as relatively smaller. In order to take look at an example of such pixel values, FIGS. 4A and 4B will be referred to, FIGS. 4A and 4B are drawings schematically illustrating an example of a multichannel integrated image to be used for performing the learning method for the sensor fusion to integrate the information acquired by the radar capable of the distance estimation and the information acquired by the camera, to thereby improve the neural network for supporting the autonomous driving in accordance with one example embodiment of the present disclosure.

Figure 4A:
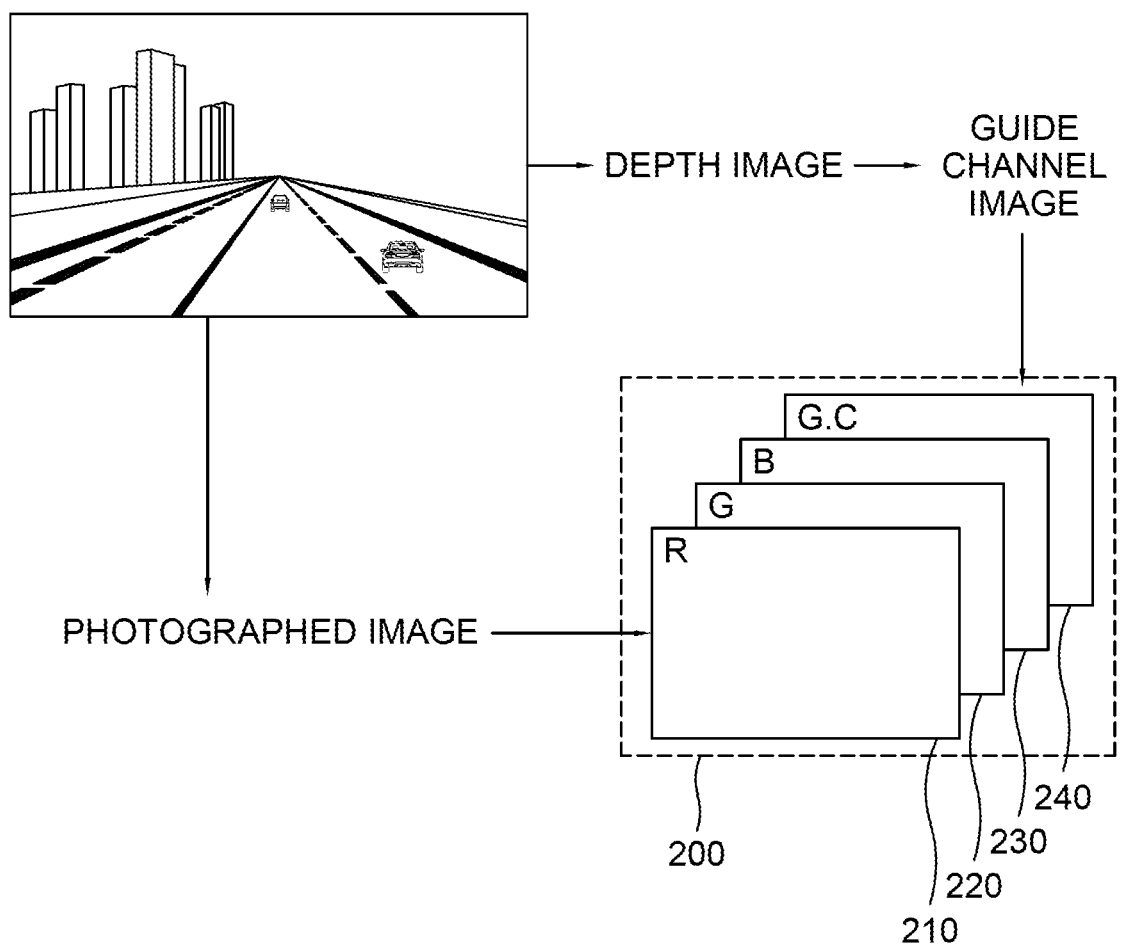
FIGS. 4A and 4B are drawings schematically illustrating an example of a multichannel integrated image to be used for performing the learning method for the sensor fusion to integrate the information acquired by the radar capable of the distance estimation and the information acquired by the camera, to thereby improve the neural network for supporting the autonomous driving in accordance with one example embodiment of the present disclosure.
Figure 4B:
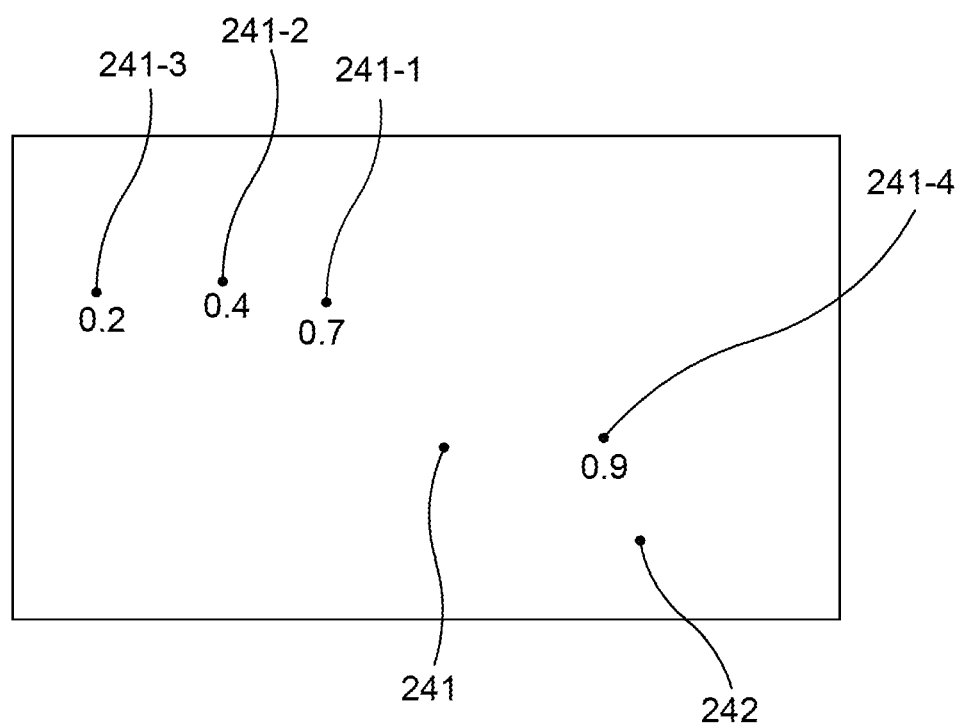

By referring to FIGS. 4A and 4B, it can be seen that the multichannel integrated image 200 has at least four channels, since the photographed image with three channels and the guide channel image with one channel, i.e., a channel for the pixel values which have been determined by using the object coordinates, have been used for generating the multichannel integrated image. Thus, foremost three channels 210, 220 and 230 may represent channels for general images acquired from cameras, for example R, G, and B in the figure or H, S and V. A backmost channel 240 may correspond to the guide channel image, and the pixel values, which has been calculated as shown above, can be seen in the backmost channel 240. That is, regarding the m-th object coordinate 241, a pixel value for a closest pixel 241-1 from the m-th object coordinate 241 can be calculated as 0.7, another pixel value for a middle pixel 241-2 can be calculated as 0.4, and still another pixel value for a farthest pixel can be calculated as 0.2. And, because of another object coordinate 242 other than the m-th object coordinate 241, still yet another pixel value for a pixel 241-4 can be calculated as even larger, as 0.9, affected by both of the another object coordinate 242 and the m-th object coordinate 241.

After the multichannel integrated image is generated as shown above, the learning device 100 may perform said steps of S01, S02 and S03, to thereby learn at least part of the parameters of the CNN 130. Such processes are similar to general training processes of a general Feed-Forward Neural Network, thus above explanations will be sufficient for a person in the art.

By performing said training processes, the CNN 130 may be trained to perform properly, by using the camera and the radar together, even when an object depiction ratio of a photographed image which represents a probability of one or more objects in the photographed image being illustrated properly is low due to a bad condition of a photographing circumstance. More specifically, even when it is too dark around the subject vehicle or weather around the subject vehicle is too harsh so that the objects are not illustrated properly on the photographed image, the CNN 130 can perform the object detection process or the image segmentation process properly. Herein, the object depiction ratio of an example image may be generated by instructing a Deep Neural Network (DNN), trained to detect information on arbitrary objects on its inputted image, to detect classes and locations of the example objects by using the example image, and calculating a probability of the DNN correctly detecting the classes and the locations. For example, the photographed image may have its object depiction ratio being smaller than a threshold, when it includes a scene of a circumstance where the number of the specific objects which are located in shadows of buildings is more than half of the number of the objects thereon.

There are many conventional arts which just linearly add the information acquired from the radar to the information acquired from the camera, but in the present disclosure, those two are not integrated linearly. That is, more deeply, the information acquired from radar is integrated with the information acquired from the camera from the beginning, i.e., the training processes. In order to integrated them more deeply, the learning device 100 may instruct the convolutional layer 131 to generate the feature map on which the information on the photographed image and the information on the depth image are reflected, and may instruct the output layer 132 and the loss layer 133 to process it to train the parameters. Accordingly, the two information can be reflected on the parameters.

So far the training processes of the present disclosure have been explained. Below, how the CNN 130 can be tested will be explained.

That is, on condition that (1) the learning device 100, if a multichannel integrated image for training, which is generated by using (i) a photographed image for training acquired through a camera for training on a subject vehicle for training interworking with the learning device and (ii) a depth image for training acquired through a radar for training thereon, is acquired, has instructed the convolutional layer 131 in the CNN 130 to apply at least one convolutional operation to the multichannel integrated image for training, to thereby generate at least one feature map for training, on which information on the photographed image for training and information on the depth image for training are reflected; (2) the learning device 100 has instructed the output layer 132 in the CNN 130 to apply at least one output operation to the feature map for training, to thereby generate estimated object information for training on the objects for training in the multichannel integrated image for training; and (3) the learning device 100 has instructed the loss layer 133 in the CNN 130 to generate at least one loss by using the estimated object information for training and Ground-Truth (GT) object information corresponding thereto, and to perform backpropagation by using the loss, to thereby learn at least part of parameters in the CNN 130, a testing device may instruct the convolutional layer 131 in the CNN 130 to apply the convolutional operation to a multichannel integrated image for testing which is generated by using (i) a photographed image for testing acquired through a camera for testing on a subject vehicle for testing interworking with the testing device and (ii) a depth image for testing acquired through a radar for testing thereon, to thereby generate at least one feature map for testing, on which information on the photographed image for testing and information on the depth image for testing are reflected.

Then, the testing device may instruct the output layer 132 in the CNN 130 to apply the output operation to the feature map for testing, to thereby generate estimated object information for testing on the objects for testing in the multichannel integrated image for testing.

Said processes are similar to the training processes except a process performed by the loss layer 133, thus it can be understood by referring to the explanations on the training processes. However, since the testing method is performed when the subject vehicle for testing is actually performing the autonomous driving, an additional process may be further performed.

That is, after the estimated object information for testing further including information on specific testing objects whose object depiction ratios are smaller than the threshold is generated, the testing device may deliver it to at least one autonomous driving module, to thereby support the autonomous driving of the subject vehicle for testing.

By performing said methods, a safer autonomous driving can be achieved even when qualities of images acquired through the cameras are bad due to the bad condition of the photographing circumstance.

It is an advantage of the present disclosure to provide the learning method for the sensor fusion to integrate the information acquired by the radar capable of the distance estimation and the information acquired by the camera, to thereby improve the neural network for supporting the autonomous driving.

It is another advantage of the present disclosure to provide a method for supporting the autonomous driving by allowing the neural network to use integrated information which has been generated by channel-wise concatenating the information acquired by the radar and the information acquired by the camera.

It is still another advantage of the present disclosure to supplement insufficient information acquired through the camera excluding information on a specific object by using additional information acquired through the radar including information on the specific object.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training a Convolutional Neural Network (CNN) by using a camera and a radar together, to thereby allow the CNN to perform properly even when an object depiction ratio of a photographed image, which represents a probability of one or more objects in the photographed image being illustrated properly, acquired through the camera is low due to a bad condition of a photographing circumstance, comprising steps of:

(a) a learning device, if a multichannel integrated image, which is generated by using (i) the photographed image acquired through the camera on a subject vehicle interworking with the learning device and (ii) a depth image acquired through the radar thereon, is acquired, instructing at least one convolutional layer in the CNN to apply at least one convolutional operation to the multichannel integrated image, to thereby generate at least one feature map, on which information on the photographed image and information on the depth image are reflected;

(b) the learning device instructing at least one output layer in the CNN to apply at least one output operation to the feature map, to thereby generate estimated object information on the objects in the multichannel integrated image; and (c) the learning device instructing at least one loss layer in the CNN to generate at least one loss by using the estimated object information and Ground-Truth (GT) object information corresponding thereto, and to perform backpropagation by using the loss, to thereby learn at least part of parameters in the CNN;

wherein, at the step of (a), the learning device (i) acquires information on one or more distances and one or more angles of the objects from the subject vehicle by referring to the depth image, (ii) finds one or more object coordinates, corresponding to at least part of the objects, on the photographed image by referring to information on the distances and the angles, (iii) generates at least one guide channel image by setting values which are generated by referring to the object coordinates and probability distributions, as its pixel values included in the guide channel image, and (iv) generates the multichannel integrated image by channel-wise concatenating the guide channel image with the photographed image.

2. The method of claim 1, wherein, at the step of (a), the learning device, by referring to a first object coordinate to an N-th object coordinate among the object coordinates and the probability distributions, performs an operation according to a following formula, to thereby calculate said values to be included in the guide channel image as its pixel values:

$$D(P_k) = \sum_{m=1}^{N} \exp\left\{-\frac{(P_{k_x} - G_{m_x})^2 + (P_{k_y} - G_{m_y})^2}{\sigma}\right\}$$

wherein $P_k$ denotes a k-th pixel among pixels included in the guide channel image, each of $P_{k_x}$ and $P_{k_y}$ denotes each of an x coordinate and a y coordinate of the k-th pixel on the guide channel image, each of $G_{m_x}$ and $G_{m_y}$ denotes each of an x coordinate and a y coordinate of an m-th object coordinate, and $\sigma$ denotes a prescribed size adjustment value, wherein m is an integer from 1 to N.

3. The method of claim 1, wherein, at the step of (b), the learning device may instruct a Region Proposal Network (RPN) interworking with the CNN to generate information on one or more estimated Region-Of-Interests (ROIs) corresponding to one or more locations of at least part of the objects on the multichannel integrated image by referring to the feature map, and may instruct the output layer which has been built as a Fully-Connected (FC) network to apply the output operation to the feature map by referring to the estimated ROIs, to thereby generate the estimated object information including an estimated object detection result corresponding to the multichannel integrated image.

4. The method of claim 1, wherein, at the step of (a), the learning device instructs each of convolutional neurons included in the convolutional layer to repeat a process of applying an operation to its inputted value by using its own at least one parameter and delivering its outputted value to its next convolutional neuron, to thereby apply the convolutional operation to the multichannel integrated image.

5. The method of claim 1, wherein, at the step of (b), the learning device instructs the output layer which has been built as at least one deconvolutional layer corresponding to the convolutional layer to apply the output operation to the feature map, to thereby generate the estimated object information including an estimated segmentation image corresponding to the multichannel integrated image.

6. The method of claim 1, wherein the learning device instructs the convolutional layer to generate the feature map on which the information on the photographed image and the information on the depth image are reflected, to thereby allow information on each of specific objects, among the objects, whose object depiction ratio is smaller than a threshold to be further included in the estimated object information.

7. A method for testing a Convolutional Neural Network (CNN) by using a camera and a radar together, to thereby allow the CNN to perform properly even when an object depiction ratio of a photographed image, which represents a probability of one or more objects in the photographed image being illustrated properly, acquired through the camera is low due to a bad condition of a photographing circumstance, comprising steps of:

(a) on condition that (1) a learning device, if a multichannel integrated image for training, which is generated by using (i) a photographed image for training acquired through a camera for training on a subject vehicle for training interworking with the learning device and (ii) a depth image for training acquired through a radar for training thereon, is acquired, has instructed at least one convolutional layer in the CNN to apply at least one convolutional operation to the multichannel integrated image for training, to thereby generate at least one feature map for training, on which information on the photographed image for training and information on the depth image for training are reflected; (2) the learning device has instructed at least one output layer in the CNN to apply at least one output operation to the feature map for training, to thereby generate estimated object information for training on the objects for training in the multichannel integrated image for training; and (3) the learning device has instructed at least one loss layer in the CNN to generate at least one loss by using the estimated object information for training and Ground-Truth (GT) object information corresponding thereto, and to perform backpropagation by using the loss, to thereby learn at least part of parameters in the CNN, a testing device instructing the convolutional layer in the CNN to apply the convolutional operation to a multichannel integrated image for testing which is generated by using (i) a photographed image for testing acquired through a camera for testing on a subject vehicle for testing interworking with the testing device and (ii) a depth image for testing acquired through a radar for testing thereon, to thereby generate at least one feature map for testing, on which information on the photographed image for testing and information on the depth image for testing are reflected; and (b) the testing device instructing the output layer in the CNN to apply the output operation to the feature map for testing, to thereby generate estimated object information for testing on the objects for testing in the multichannel integrated image for testing;

wherein, at the step of (a), the testing device (i) acquires information for testing on one or more distances for testing and one or more angles for testing of the objects for testing from the subject vehicle for testing by referring to the depth image for testing, (ii) finds one or more object coordinates for testing, corresponding to at least part of the objects for testing, on the photographed image for testing by referring to information for testing on the distances for testing and the angles for testing, (iii) generates at least one guide channel image for testing by setting values which are generated by referring to the object coordinates for testing and probability distributions for testing, as its pixel values for testing included in the guide channel image for testing, and (iv) generates the multichannel integrated image for testing by channel-wise concatenating the guide channel image for testing with the photographed image for testing.

8. The method of claim 7, wherein, at the step of (a), the testing device, by referring to a first object coordinate for testing to an N-th object coordinate for testing among the object coordinates for testing and the probability distributions for testing, performs an operation according to a following formula, to thereby calculate said values to be included in the guide channel image for testing as its pixel values for testing:

$$D(P_k) = \sum_{m=1}^{N} \exp\left\{-\frac{(P_{k_x} - G_{m_x})^2 + (P_{k_y} - G_{m_y})^2}{\sigma}\right\}$$

wherein $P_k$ denotes a k-th pixel among pixels included in the guide channel image for testing, each of $P_{k_x}$ and $P_{k_y}$ denotes each of an x coordinate and a y coordinate of the k-th pixel on the guide channel image for testing, each of $G_{m_x}$ and $G_{m_y}$ denotes each of an x coordinate and a y coordinate of an m-th object coordinate for testing, and $\sigma$ denotes a prescribed size adjustment value for testing, wherein m is an integer from 1 to N.

9. The method of claim 7, wherein the testing device instructs the convolutional layer to generate the feature map for testing on which the information on the photographed image for testing and the information on the depth image for testing are reflected, to thereby allow information on each of specific objects for testing, among the objects, for testing whose object depiction ratio is smaller than a threshold to be further included in the estimated object information for testing, and the method further comprises a step of:

(c) the testing device delivering the estimated object information for testing to at least one autonomous driving module on the subject vehicle for testing, to thereby support the autonomous driving of the subject vehicle for testing.

10. A learning device for training a Convolutional Neural Network (CNN) by using a camera and a radar together, to thereby allow the CNN to perform properly even when an object depiction ratio of a photographed image, which represents a probability of one or more objects in the photographed image being illustrated properly, acquired through the camera is low due to a bad condition of a photographing circumstance, comprising:

at least one memory that stores instructions; and at least one processor configured to execute the instructions to perform processes of:

(I) if a multichannel integrated image, which is generated by using (i) the photographed image acquired through the camera on a subject vehicle interworking with the learning device and (ii) a depth image acquired through the radar thereon, is acquired, instructing at least one convolutional layer in the CNN to apply at least one convolutional operation to the multichannel integrated image, to thereby generate at least one feature map, on which information on the photographed image and information on the depth image are reflected;

(II) instructing at least one output layer in the CNN to apply at least one output operation to the feature map, to thereby generate estimated object information on the objects in the multichannel integrated image; and (III) instructing at least one loss layer in the CNN to generate at least one loss by using the estimated object information and Ground-Truth (GT) object information corresponding thereto, and to perform backpropagation by using the loss, to thereby learn at least part of parameters in the CNN;

wherein, at the process of (I), the processor (i) acquires information on one or more distances and one or more angles of the objects from the subject vehicle by referring to the depth image, (ii) finds one or more object coordinates, corresponding to at least part of the objects, on the photographed image by referring to information on the distances and the angles, (iii) generates at least one guide channel image by setting values which are generated by referring to the object coordinates and probability distributions, as its pixel values included in the guide channel image, and (iv) generates the multichannel integrated image by channel-wise concatenating the guide channel image with the photographed image.

11. The device of claim 10, wherein, at the process of (I), the processor, by referring to a first object coordinate to an N-th object coordinate among the object coordinates and the probability distributions, performs an operation according to a following formula, to thereby calculate said values to be included in the guide channel image as its pixel values:

$$D(P_k) = \sum_{m=1}^{N} \exp\left\{-\frac{(P_{k_x} - G_{m_x})^2 + (P_{k_y} - G_{m_y})^2}{\sigma}\right\}$$

wherein $P_k$ denotes a k-th pixel among pixels included in the guide channel image, each of $P_{k_x}$ and $P_{k_y}$ denotes each of an x coordinate and a y coordinate of the k-th pixel on the guide channel image, each of $G_{m_x}$ and $G_{m_y}$ denotes each of an x coordinate and a y coordinate of an m-th object coordinate, and $\sigma$ denotes a prescribed size adjustment value, wherein m is an integer from 1 to N.

12. The device of claim 10, wherein, at the process of (II), the processor may instruct a Region Proposal Network (RPN) interworking with the CNN to generate information on one or more estimated Region-Of-Interests (ROIs) corresponding to one or more locations of at least part of the objects on the multichannel integrated image by referring to the feature map, and may instruct the output layer which has been built as a Fully-Connected (FC) network to apply the output operation to the feature map by referring to the estimated ROIs, to thereby generate the estimated object information including an estimated object detection result corresponding to the multichannel integrated image.

13. The device of claim 10, wherein, at the process of (I), the processor instructs each of convolutional neurons included in the convolutional layer to repeat a process of applying an operation to its inputted value by using its own at least one parameter and delivering its outputted value to its next convolutional neuron, to thereby apply the convolutional operation to the multichannel integrated image.

14. The device of claim 10, wherein, at the process of (II), the processor instructs the output layer which has been built as at least one deconvolutional layer corresponding to the convolutional layer to apply the output operation to the feature map, to thereby generate the estimated object information including an estimated segmentation image corresponding to the multichannel integrated image.

15. The device of claim 10, wherein the processor instructs the convolutional layer to generate the feature map on which the information on the photographed image and the information on the depth image are reflected, to thereby allow information on each of specific objects, among the objects, whose object depiction ratio is smaller than a threshold to be further included in the estimated object information.

16. A testing device for testing a Convolutional Neural Network (CNN) by using a camera and a radar together, to thereby allow the CNN to perform properly even when an object depiction ratio of a photographed image, which represents a probability of one or more objects in the photographed image being illustrated properly, acquired through the camera is low due to a bad condition of a photographing circumstance, comprising:

at least one memory that stores instructions; and at least one processor configured to execute the instructions to perform processes of:

(I) on condition that (1) a learning device, if a multichannel integrated image for training, which is generated by using (i) a photographed image for training acquired through a camera for training on a subject vehicle for training interworking with the learning device and (ii) a depth image for training acquired through a radar for training thereon, is acquired, has instructed at least one convolutional layer in the CNN to apply at least one convolutional operation to the multichannel integrated image for training, to thereby generate at least one feature map for training, on which information on the photographed image for training and information on the depth image for training are reflected; (2) the learning device has instructed at least one output layer in the CNN to apply at least one output operation to the feature map for training, to thereby generate estimated object information for training on the objects for training in the multichannel integrated image for training; and (3) the learning device has instructed at least one loss layer in the CNN to generate at least one loss by using the estimated object information for training and Ground-Truth (GT) object information corresponding thereto, and to perform backpropagation by using the loss, to thereby learn at least part of parameters in the CNN, instructing the convolutional layer in the CNN to apply the convolutional operation to the multichannel integrated image for testing which is generated by using (i) a photographed image for testing acquired through a camera for testing on a subject vehicle for testing interworking with the testing device and (ii) a depth image for testing acquired through a radar for testing thereon, to thereby generate at least one feature map for testing, on which information on the photographed image for testing and information on the depth image for testing are reflected; and (II) instructing the output layer in the CNN to apply the output operation to the feature map for testing, to thereby generate estimated object information for testing on the objects for testing in the multichannel integrated image for testing;

wherein, at the process of (I), the processor (i) acquires information for testing on one or more distances for testing and one or more angles for testing of the objects for testing from the subject vehicle for testing by referring to the depth image for testing, (ii) finds one or more object coordinates for testing, corresponding to at least part of the objects for testing, on the photographed image for testing by referring to information for testing on the distances for testing and the angles for testing, (iii) generates at least one guide channel image for testing by setting values which are generated by referring to the object coordinates for testing and probability distributions for testing, as its pixel values for testing included in the guide channel image for testing, and (iv) generates the multichannel integrated image for testing by channel-wise concatenating the guide channel image for testing with the photographed image for testing.

17. The device of claim 16, wherein, at the process of (I), the processor, by referring to a first object coordinate for testing to an N-th object coordinate for testing among the object coordinates for testing and the probability distributions for testing, performs an operation according to a following formula, to thereby calculate said values to be included in the guide channel image for testing as its pixel values for testing:

$$D(P_k) = \sum_{m=1}^{N} \exp\left\{-\frac{(P_{k_x} - G_{m_x})^2 + (P_{k_y} - G_{m_y})^2}{\sigma}\right\}$$

wherein $P_k$ denotes a k-th pixel among pixels included in the guide channel image for testing, each of $P_{k_x}$ and $P_{k_y}$ denotes each of an x coordinate and a y coordinate of the k-th pixel on the guide channel image for testing, each of $G_{m_x}$ and $G_{m_y}$ denotes each of an x coordinate and a y coordinate of an m-th object coordinate for testing, and σ denotes a prescribed size adjustment value for testing, wherein m is an integer from 1 to N.

18. The device of claim 16, wherein the processor instructs the convolutional layer to generate the feature map for testing on which the information on the photographed image for testing and the information on the depth image for testing are reflected, to thereby allow information on each of specific objects for testing, among the objects for testing, whose object depiction ratio is smaller than a threshold to be further included in the estimated object information for testing, and the processor further performs a process of:

(III) delivering the estimated object information for testing to at least one autonomous driving module on the subject vehicle for testing, to thereby support the autonomous driving of the subject vehicle for testing.

* * * * *